(12) United States Patent
Fan et al.

(10) Patent No.: US 12,470,837 B1
(45) Date of Patent: Nov. 11, 2025

(54) GREEN IMAGE CORRECTION IN PHASE-DETECTION IMAGE SENSOR REMOSAICING

(71) Applicant: OmniVision Technologies, Inc., Santa Clara, CA (US)

(72) Inventors: Lei Fan, Santa Clara, CA (US); Yiyi Ren, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 27 days.

(21) Appl. No.: 18/769,529

(22) Filed: Jul. 11, 2024

(51) Int. Cl.
*H04N 23/84* (2023.01)
*G06T 5/73* (2024.01)
*H04N 23/81* (2023.01)

(52) U.S. Cl.
CPC ............ *H04N 23/843* (2023.01); *G06T 5/73* (2024.01); *H04N 23/81* (2023.01); *G06T 2207/10024* (2013.01)

(58) Field of Classification Search
CPC ........ H04N 23/843; H04N 23/81; G06T 5/73; G06T 2207/10024
See application file for complete search history.

(56) References Cited

U.S. PATENT DOCUMENTS

| | | | | |
|---|---|---|---|---|
| 9,179,113 | B2* | 11/2015 | Tachi | H04N 25/134 |
| 12,279,050 | B2* | 4/2025 | Ren | H04N 25/704 |
| 2021/0217134 | A1* | 7/2021 | Okamura | G06T 3/4015 |
| 2021/0377497 | A1* | 12/2021 | Bernstein | H04N 25/447 |
| 2023/0196507 | A1* | 6/2023 | Hu | G06T 3/40 |
| | | | | 382/299 |
| 2024/0397211 | A1* | 11/2024 | Ren | H04N 25/704 |
| 2024/0422444 | A1* | 12/2024 | Ren | H04N 25/11 |

* cited by examiner

*Primary Examiner* — Antoinette T Spinks

(57) ABSTRACT

An imaging system comprising (1) a phase-detection image sensor comprising a plurality of phase-detection (PD) pixel units, each pixel unit comprises an upper left PD pixel, an upper right PD pixel, a lower left PD pixel, and a lower right PD pixel, the upper left PD pixel, the upper right PD pixel, the lower left PD pixel, and the lower right PD pixel covered by a microlens, and (2) a processor configured to: interpolate a green image to obtain a full resolution interpolated green image, and convolute the full resolution interpolated green image with an N×N kernel, where the N×N kernel satisfies conditions including the total contribution from all upper left pixels, the total contribution from all upper right pixels, the total contribution from all lower left pixels, and the total contribution from all lower right PD pixels in the convolution, being the same.

14 Claims, 12 Drawing Sheets

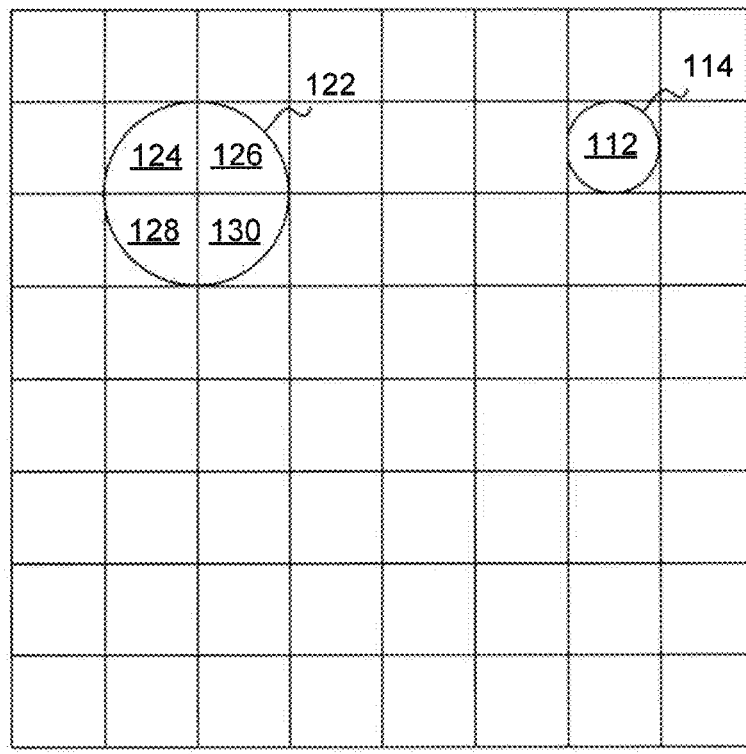
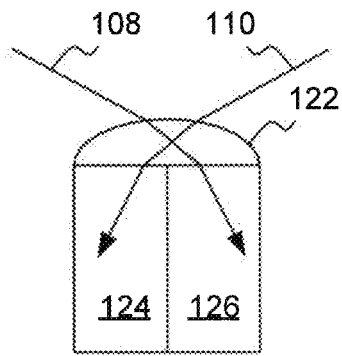
Fig. 1C
Fig. 1D

Red

Green

Blue

Red

Green

Blue

Red

Green

Blue

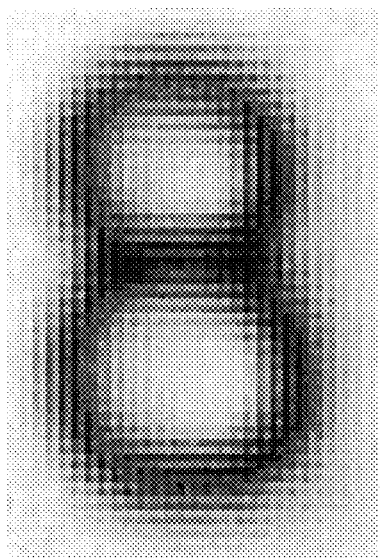 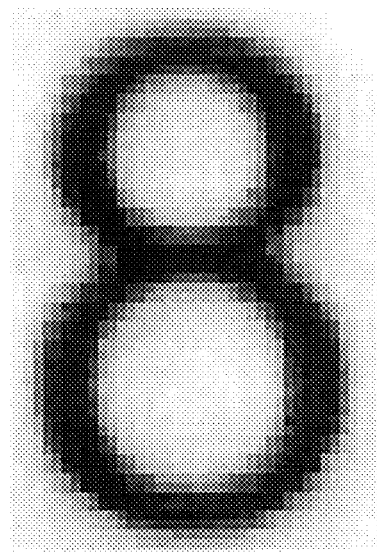
Fig. 6A
Fig. 6B

GREEN IMAGE CORRECTION IN PHASE-DETECTION IMAGE SENSOR REMOSAICING

FIELD OF THE INVENTION

This disclosure relates to phase-detection image sensor remosicing, and particularly green image correction in phase-detection image sensor remosaicing.

BACKGROUND OF THE INVENTION

The vast majority of electronic cameras have autofocus capability. Recently, phase-detection autofocus (PDAF) has gained popularity. The autofocus function automatically focuses the camera on objects in the scene viewed by the camera. Autofocus may be fully automatic such that the camera identifies objects in the scene and focuses on the objects. In some cases, the camera may even decide which objects are more important than other objects and subsequently focus on the more important objects. Alternatively, autofocus may utilize user input specifying which portion or portions of the scene are of interest. Based thereupon, the autofocus function identifies objects within the portion or portions of the scene, specified by the user, and focuses the camera on such objects. These functions are realized by PDAF.

After autofocusing, e.g., using PDAF, a captured image generally have in-focus portions and defocused portions, because not all portions of the image are at the same distance from the camera. If a phase-detection (PD) image sensor is used to perform PDAF, the defocused portions may generate artifacts. If the artifacts of the defocused portions are removed using low pass filtering, the in-focus portions may be affected and become blur. Accordingly, a PD image sensor that can present unaffected in-focus portions and defocused portions having artifacts removed, is demanded.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1C shows a pixel array comprising a plurality of PD pixels and a plurality of microlenses covering PD pixels.

FIG. 1D shows a cross-section of microlens covering upper left PD pixel and upper right PD pixel.

FIG. 6A shows a defocused portion of a full resolution interpolated green image.

FIG. 6B shows an in-focus portion of a full resolution interpolated green image.

Figure 1A:
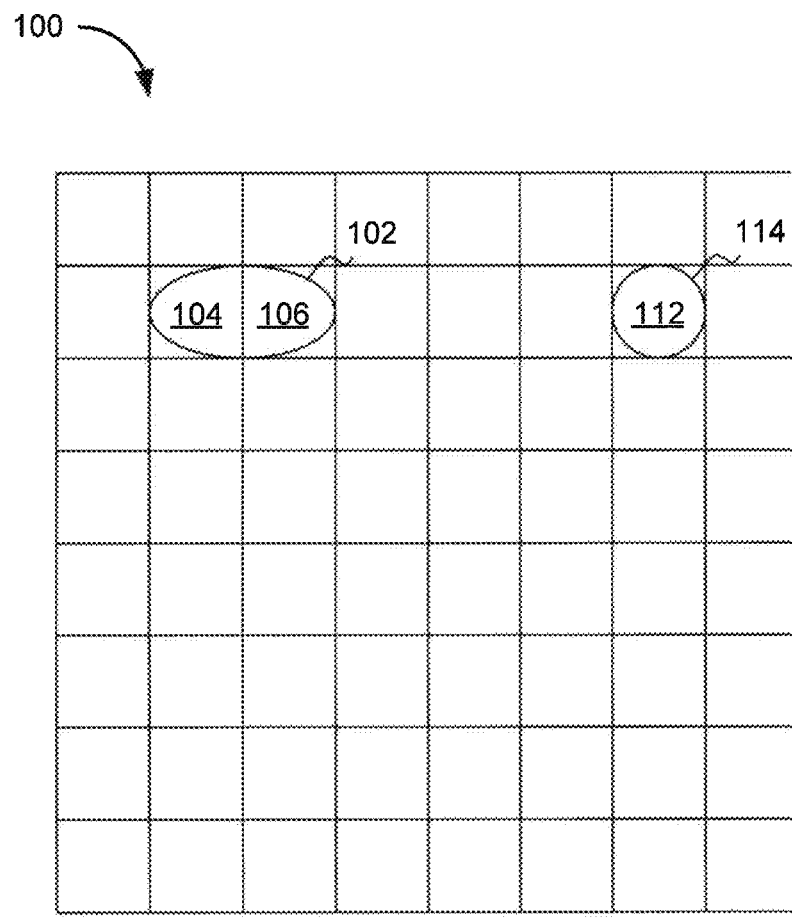
FIG. 1A shows a pixel array of a PD image sensor having PDAF capability.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

FIG. 1A shows a pixel array 100 of a phase-detection (PD) image sensor having PDAF capability. In an embodiment, two pixels, e.g., left phase-detection (PD) pixel and right PD pixel, are covered by a microlens. The phase difference, e.g., detected intensity difference, between the left PD pixel and the right PD pixel is determined to perform autofocus. Pixel array 100 comprises a plurality of PD pixels. A microlens 102 covers a left PD pixel 104 and a right PD pixel 106. PD pixels 104 and 106 form a PD pixel unit. Pixel array 100 may also include a plurality of image pixels 112. Each image pixel has a microlens 114. An image pixel cannot function as a PD pixel, but a PD pixel can function as an image pixel.

Figure 1B:
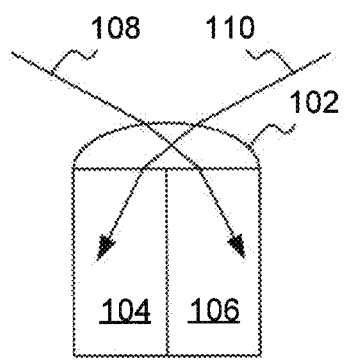
FIG. 1B shows a cross-section of microlens covering left PD pixel and right PD pixel.

FIG. 1B shows a cross-section of microlens 102 covering left PD pixel 104 and right PD pixel 106. Light 108 coming from left side in a camera (not shown) is incident at microlens 102 and is directed to right PD pixel 106. Light 110 coming from right side in the camera (not shown) is incident at microlens 102 and is directed to left PD pixel 104. Left PD pixel 104 detects a left image of a PD image, which is the image detected by the PD image sensor. Right PD pixel 106 detects a right image of the PD image.

In an embodiment, four pixels are covered by a microlens as shown in FIG. 1C. FIG. 1C shows a pixel array 120 comprising a plurality of PD pixels and a plurality of microlenses covering PD pixels. A microlens 122 covers an upper left PD pixel 124, an upper right PD pixel 126, a lower left PD pixel 128, and a lower right PD pixel 130. PD pixels 124, 126, 128, and 130 form a PD pixel unit or a super pixel as will be seen later. The two words, PD pixel unit and super pixel, are used interchangeably. Pixel array 120 may also include a plurality of image pixels 112. Each image pixel has a microlens 114. An image pixel cannot function as a PD pixel, but a PD pixel can function as an image pixel.

A one-dimensional cross-section of microlens 122 covering PD pixels 124, 126, 128, and 130 is shown in FIG. 1D. FIG. 1D is similar to FIG. 1B, where microlens 102 is replaced by microlens 122, PD pixel 104 is replaced by PD pixel 124, and PD pixel 106 is replaced by PD pixel 126. PD pixels 128 and 130 are not shown in the cross-section. PD pixels 124, 126, 128, and 130 may be recognized as an upper left PD pixel, an upper right PD pixel, a lower left PD pixel, and a lower right PD pixel, respectively.

Figures 2A, 2B, 2C:
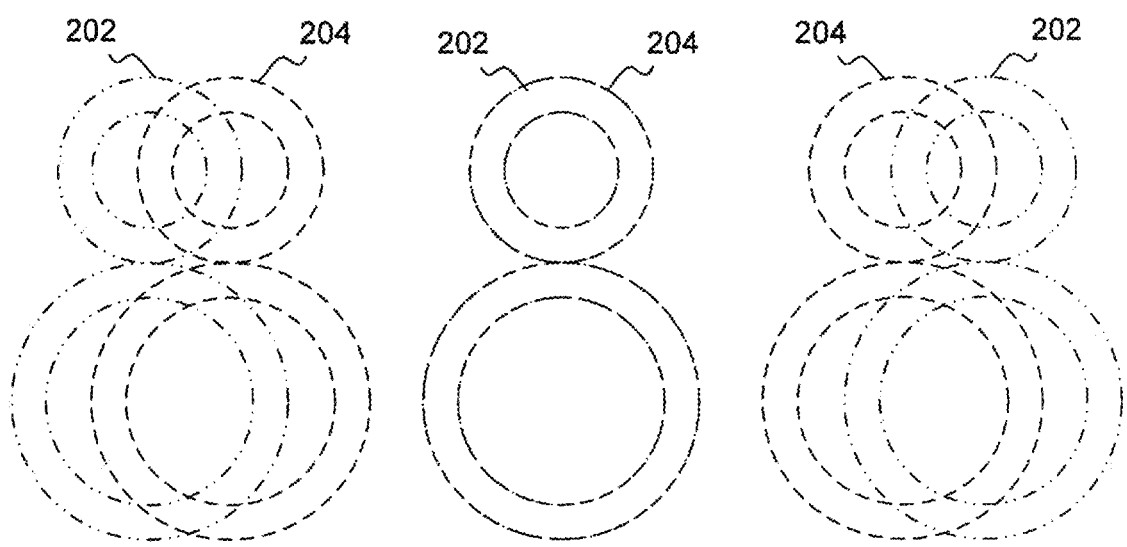
FIG. 2A shows left image separated from right image to left.
FIG. 2B shows left image overlapping with right image.
FIG. 2C shows left image separated from right image to right.

FIGS. 2A-2C show a left image of PD image and a right image of PD image formed by left PD pixels and right PD pixels, respectively. The PD image is referred to as the image detected by a PD image sensor prior to any processing. A PD image has a left image and a right image. FIG. 2A shows a left image 202 separated from a right image 204 to left, when the PD image is defocused, e.g., front defocused. FIG. 2B shows left image 202 overlapping with right image 204, when the image is in-focus. FIG. 2C shows left image 202 separated from right image 204 to right, when the PD image is defocused, e.g., back defocused. An imaging lens of the camera (not shown) is moved to achieve one as shown in FIG. 2B, that is left image 202 overlapping with right image 204. However, since not all objects captured in the PD image have the same distance from the camera, some portions of the PD image may be in-focus, and some portions of the PD image may be defocused.

Figure 3A:
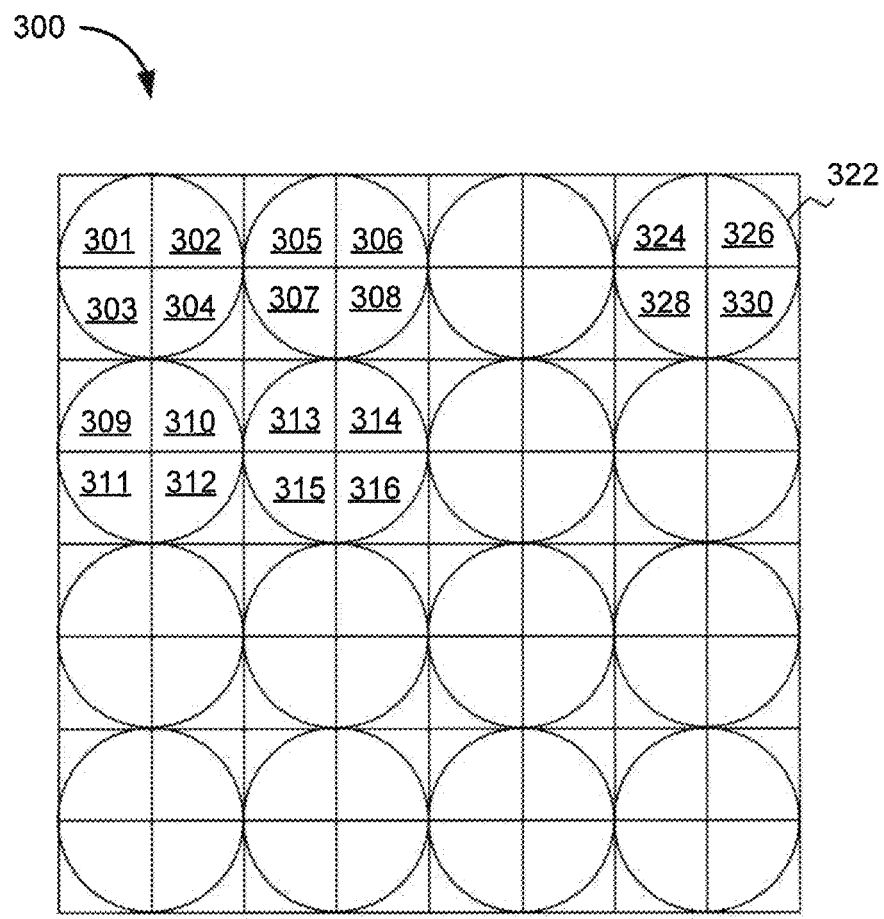
FIG. 3A shows a pixel array comprising a plurality of PD pixels and a plurality of microlens covering PD pixels.
Figure 3B:
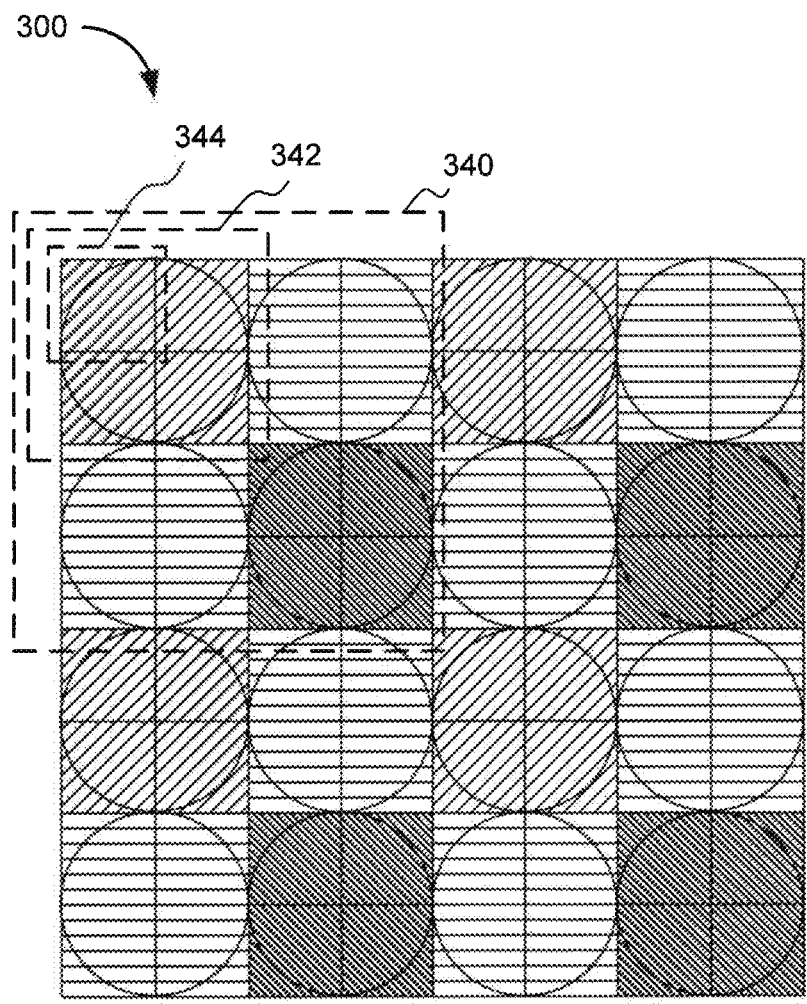
FIG. 3B shows a group of four pixels of one color.
Figure 3B:
Figure 3B:
Figure 3B:
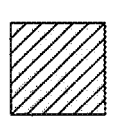

In an embodiment, all pixels of a pixel array may be PD pixels. In the embodiment, every four pixels may be covered by a microlens as shown in FIGS. 3A and 3B. FIG. 3A shows a pixel array 300 comprising a plurality of PD pixels and a plurality of microlens covering PD pixels. A microlens 322 covers four PD pixels, e.g., pixels 324, 326, 328, and 330. For example, PD pixels 301, 302, 303, and 304 may be blue pixels. PD pixels 305, 306, 307, and 308 may be green pixels. PD pixels 309, 310, 311, and 312 may be also green pixels. PD pixels 313, 314, 315, and 316 may be red pixels. FIG. 3B shows pixel array 300 to better show the distribution of color pixels. It is appreciated that other distributions of color pixels are also possible.

In the embodiment shown in FIG. 3A, pixels 324, 326, 328 and 330 do not only function as PD pixels, but they also function as image pixels as well. Furthermore, all pixels in pixel array 300 shown in FIG. 3A and FIG. 3B function as PD pixels as well as image pixels. They function as PD pixels when the phase difference between a pair of pixels that are covered by the same microlens is determined. They function as image pixels when they are read individually to form a PD image.

Figure 4:
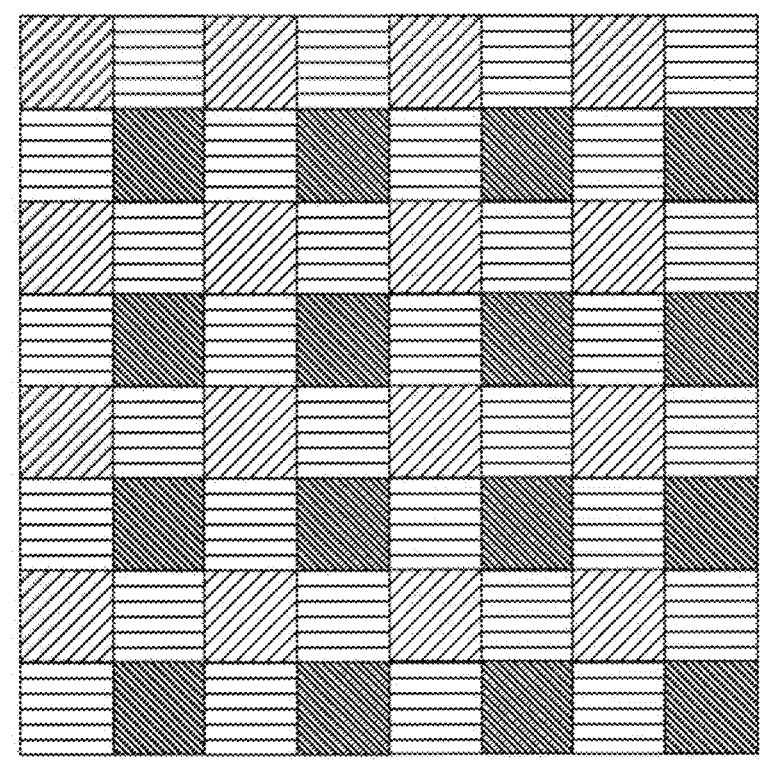
FIG. 4 shows a Bayer pattern composed by each individual pixel of PD image sensor.
Figure 4:
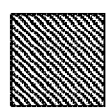
Figure 4:
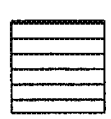
Figure 4:
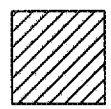

FIG. 3B shows that a group of four pixels is of one color. Furthermore, FIG. 3B shows a first Bayer pattern 340 having 2×2 super pixels. Super pixel is the same as PD pixel unit. Each super pixel, e.g., super pixel 342, consisting of 2×2 pixels, e.g., pixel 344 (which is a PD pixel as well as an image pixel), of the PD image sensor. To enhance the resolution of the PD image as detected by the PD image sensor, pixels included in a super pixel, are redistributed to form a second Bayer pattern 400 composed by each individual pixel of the PD image sensor as shown in FIG. 4. It is important to note that Bayer pattern 400 is not a physical pixel array. In contrast, pixel array 300 is a physical pixel array. Bayer pattern 400 is analytical. This process is known as remosaicing Bayer image. The remosaiced Bayer image, which is Bayer pattern 400, has a green image, a blue image, and a red image. The remosaiced Bayer image (second Bayer pattern) has doubled resolution in x and y directions as compared with the image of Bayer pattern 340 (first Bayer pattern) having super pixels of FIG. 3B.

A super pixel in first Bayer pattern 340 is considered as a single unit. The value of the single unit is typically taken as the sum of four pixels of the super pixels. Taking the sum of four pixels is known as binning.

Figure 5:
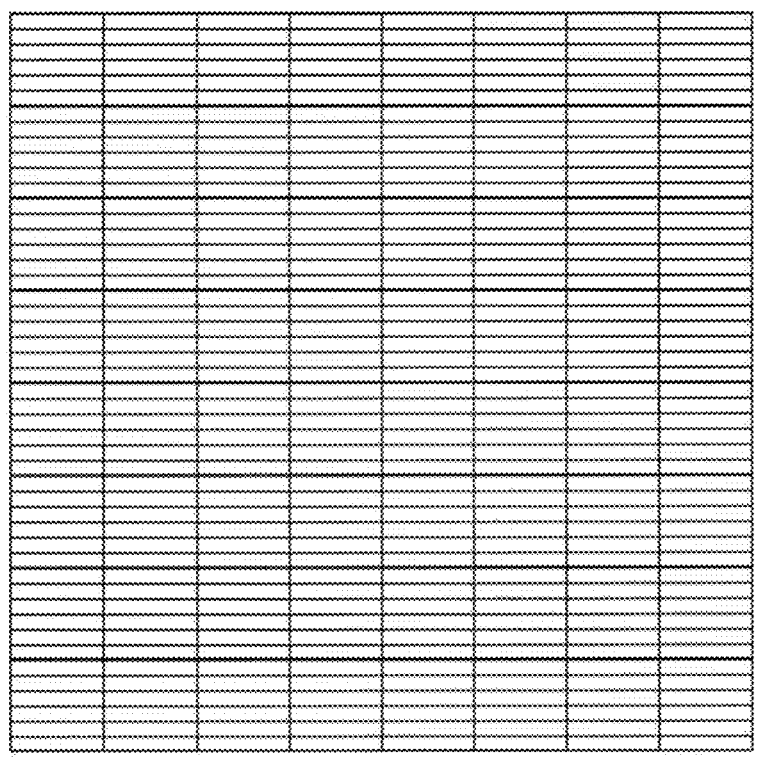
FIG. 5 shows a full resolution interpolated green image having no missing green pixels.
Figure 5:
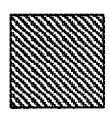
Figure 5:
Figure 5:
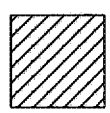

In remosaicing Bayer image, a green image is first interpolated, e.g., from Bayer pattern 340 of FIG. 3B, to obtain an interpolated green image in full resolution. Full resolution interpolated green image is referred to as a green image 500 having no missing green pixels as shown in FIG. 5.

A PD image captured by a PD image sensor comprising pixel array 300 of FIGS. 3A and 3B may have some portions in-focus, and some portions defocused. Referring back to FIGS. 1D, in the in-focus portions, left PD pixel 124 and right PD pixel 126 of a PD pixel unit detect the same light intensity, because left image 202 of PD image are overlapping with right image 204 of PD image as shown in FIG. 2B.

However, in the defocused portions, left PD pixel 124 and right PD pixel 126 detect different light intensities, because left image 202 of PD image is shifted away from right image 204 of PD image as shown in FIG. 2A or FIG. 2C. A left pixel of a PD pixel unit is next to a right pixel of the same PD pixel unit. Therefore, in the defocused portions, two neighboring pixels, e.g., left and right PD pixels, have different intensities. This generates artifacts in the captured PD image.

Similar explanation applies to pixel array 300 in FIGS. 3A and 3B. In the in-focus portions, pixels 301, 302, 303, and 304 have same intensity. In the defocused portions, pixels 301, 302, 303, and 304 have different intensities. Different intensities of the neighboring pixels generate artifact in a PD image captured by the PD image sensor having pixel array 300.

Interpolation algorithms for red, green, and blue images are available. They are not discussed in detail here, since they are not essential to the present invention. In this disclosure, it is understood that a full resolution interpolated green image is obtained or is already obtained. The full resolution interpolated green image includes defocused portions having artifacts and in-focus portions having sharp image. Using the disclosed method of the present invention, the full resolution interpolated green image is corrected by removing the artifacts generated by the intensity difference of neighboring PD pixels, but presrving the sharp image. The corrected full resolution interpolated green image is then used to remosaic Bayer image with artifacts removed and preserved sharp image.

For example, FIG. 6A shows a defocused portion of the full resolution interpolated green image from a PD image captured by an image sensor having left PD pixels and right PD pixels. In this example, the whole FIG. 6A is the defocused image. The defocused portion shows artifacts in the image. Simply speaking, the artifact appears as a white pixel between two black pixels. The white pixel is a left PD pixel of a PD pixel unit, and the black pixels are a right PD pixel of the same PD pixel unit and a right PD pixel of the neighboring PD pixel unit. For comparison, FIG. 6B shows an in-focus portion of the full resolution interpolated green image, which shows sharp image. In this example, the whole FIG. 6B is the in-focus image. No artifact appears in the in-focus portion as shown in FIG. 6B.

The artifacts in the defocused portion shown in FIG. 6A may be simply removed using a low pass filter. However, the low pass filter will blur the sharp image in the in-focus portion shown in FIG. 6B, at the same time the artifact being removed. Alternatively, the artifacts generated by the intensity difference of PD pixels under one microlens can be removed by binning all PD pixels under one microlens. For example, pixels 301, 302, 304, and 306 under one microlens, are binned or summed to a single value. Thus, no more intensity difference of pixels 301, 302, 304, and 306. However, the resolution of the binned image will be reduced to ¼ of the resolution of the original image before binning.

Figure 7:
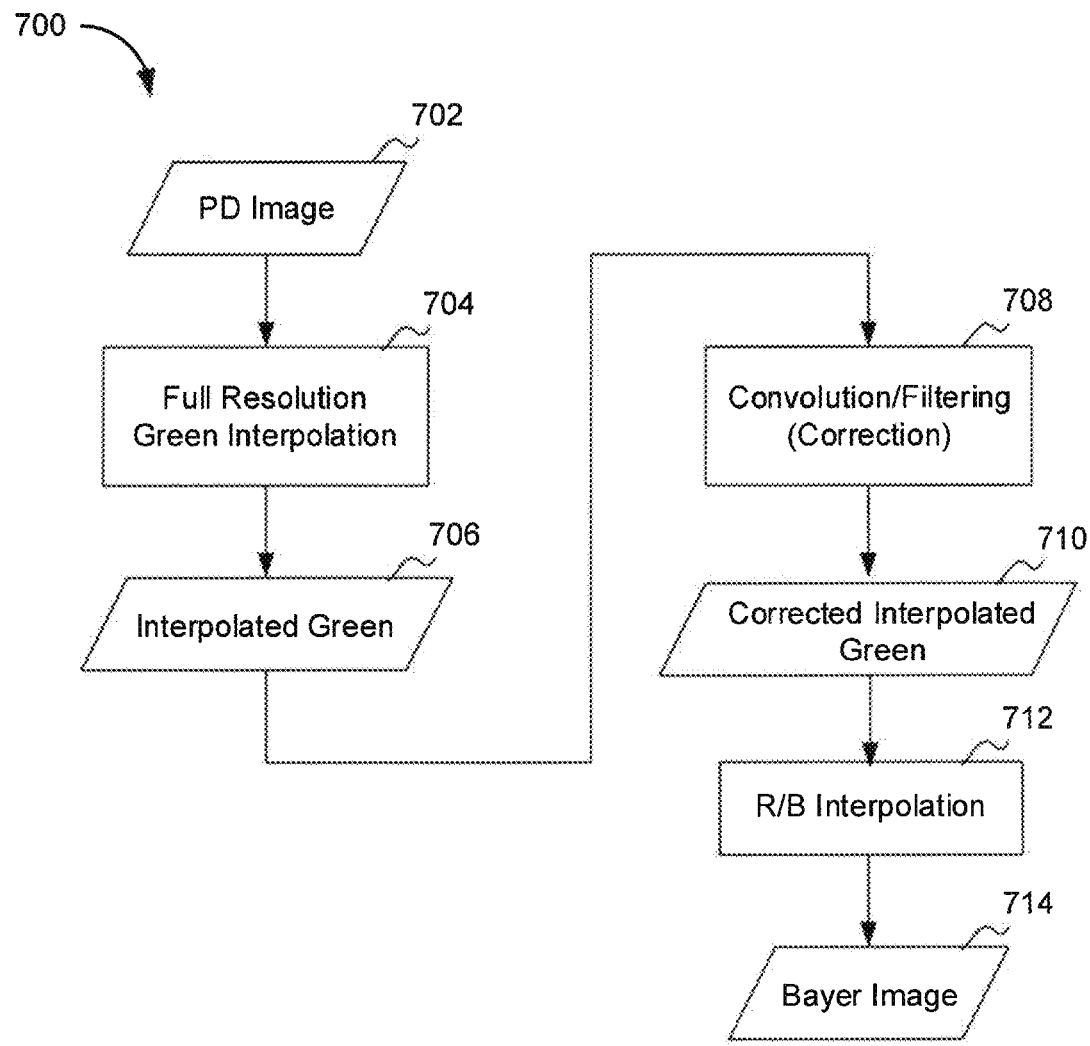
FIG. 7 is a remosaicing method, according to an embodiment of the present invention.

To remove the artifacts in the defocused portions but preserve the sharp image in the in-focus portions, a remosaicing method 700 is disclosed as shown in FIG. 7, according to an embodiment of the present invention. Block 702 indicates a PD image, for example, which is produced by a PD image sensor having pixel array 300 shown in FIG. 3B.

Block 704 shows the process of obtaining full resolution interpolated green image from the PD image of block 702. A variety of algorithm are available. They are not discussed in detail here, since they are not essential to the present invention. Block 706 shows a full resolution interpolated green image after the process of obtaining full resolution green interpolation of block 704 is completed. The full resolution interpolated green image includes portions having artifacts and portions having sharp image.

Block 708 shows the full resolution interpolated green image including portions having artifacts and portions having sharp image being convoluted or filtered with a kernel according to an embodiment of the present invention to produce a corrected interpolated green image. Block 710 shows a corrected full resolution interpolated green image after the convolution or filtering of full resolution green interpolation of block 708 is completed. After convolution or filtering, the artifacts of the full resolution interpolated green image of block 706 are removed, and the sharp image in the full resolution interpolated green image of block 706 is preserved.

Block 712 shows red and blue interpolation partially based on the corrected full resolution interpolated green image of block 710. It is appreciated that the interpolation of block 712 is not for producing full resolution interpolated red and blue images. Instead, it is for producing a Bayer image, which is shown as second Bayer pattern 400 of FIG. 4.

A Bayer image comprises a green image having missing green pixels (missing two pixels in a Bayer pattern), a blue image having missing blue pixels (missing three pixels in a Bayer pattern), and a red image having missing red pixels (missing three pixels in a Bayer pattern). In contrast, a full resolution interpolated image has no missing pixel. Block 714 shows a remosaiced Bayer image following remosaicing method 700. A remosaiced Bayer image is formed using the interpolated blue and red images of block 712 and part of the corrected interpolated green image of block 710.

The remosaicing method outputs a Bayer image, e.g., Bayer image of block 714. The Bayer image comprises Bayer patterns. Each Bayer pattern comprises a red pixel, two green pixels, and a blue pixel, which is similar to second Bayer pattern 400. The mosaicing method does not output full resolution red, green, and blue images.

In block 712, red and blue images are interpolated partially based on the corrected full resolution interpolated green image of block 710, and. partially based on the color image forming the first Bayer pattern, which is PD image shown in block 702.

Remosaicing method 700 processes a PD image 702 having a first Bayer pattern 340 as shown in FIG. 3B to be a Bayer image 714, which has a second Bayer pattern 400 as shown in FIG. 4, without losing the original resolution, according to an embodiment of the present invention. It is appreciated that remosaicing method 700 may include more blocks or steps not shown in FIG. 7.

In an embodiment, a microlens covers a pixel unit (pixel unit is the same as super pixel), and the pixel units may have 2×2, 4×4, 8×8, or 16×16 pixels. In principle, a pixel unit may have M×M pixels, where M is any integer.

Figure 8A:
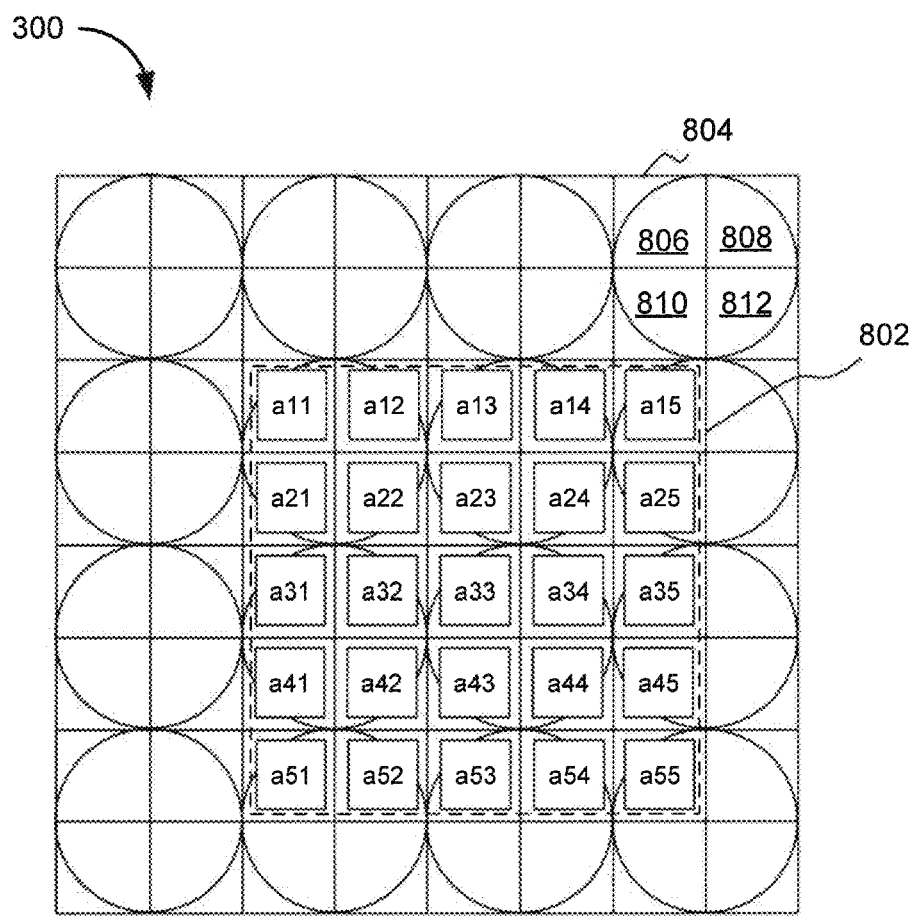
FIG. 8A shows a 5×5 kernel or convolution matrix on top of an image, according to an embodiment of the present invention.

FIG. 8A shows, for example, a 5×5 kernel 802 (Kernel 1), which is a convolution matrix, a11 a12 a13 a14 a15
a21 a22 a23 a24 a25
a31 a32 a33 a34 a35 (Kernel 1)
a41 a42 a43 a44 a45
a41 a52 a53 a54 a55 on top of an image 804 produced by pixel array 300, in which a pixel unit has 2×2 pixels, when a convolution is in process.

Elements of Kernel 1 are written as a11 for easy reading. 11 should be 1,1 or ij or i,j, and should be written as subscripts. However, subscripts may be too small to read, for easy reading, all is written in the same font. The true representation of elements of kernel is shown in Equation (3), which will be seen later.

For illustration, pixel 806 is an upper left PD pixel, pixel 808 is an upper right PD pixel, pixel 810 is a lower left PD pixel, and pixel 812 is a lower right PD pixel. Referring to this illustration, element of kernel a11 is located at a position of upper left PD pixel, a12 is located at a position of upper right PD pixel, a13 is located at a position of upper left PD pixel, a14 is located at a position of upper right PD pixel, and a15 is located at a position of upper left PD pixel. And so on.

Furthermore, a11, a13, a15, a31, a33, a35, a51, a53, a55 are located at positions of upper left PD pixels, respectively. a12, a14, a32, a34, a52, a54 are located at positions of upper right PD pixels, respectively. a21, a23, a25, a41, a43, a45 are located at positions of lower left PD pixels, respectively. a22, a24, a42, a44 are located at positions of lower right PD pixels, respectively.

Figure 8B:
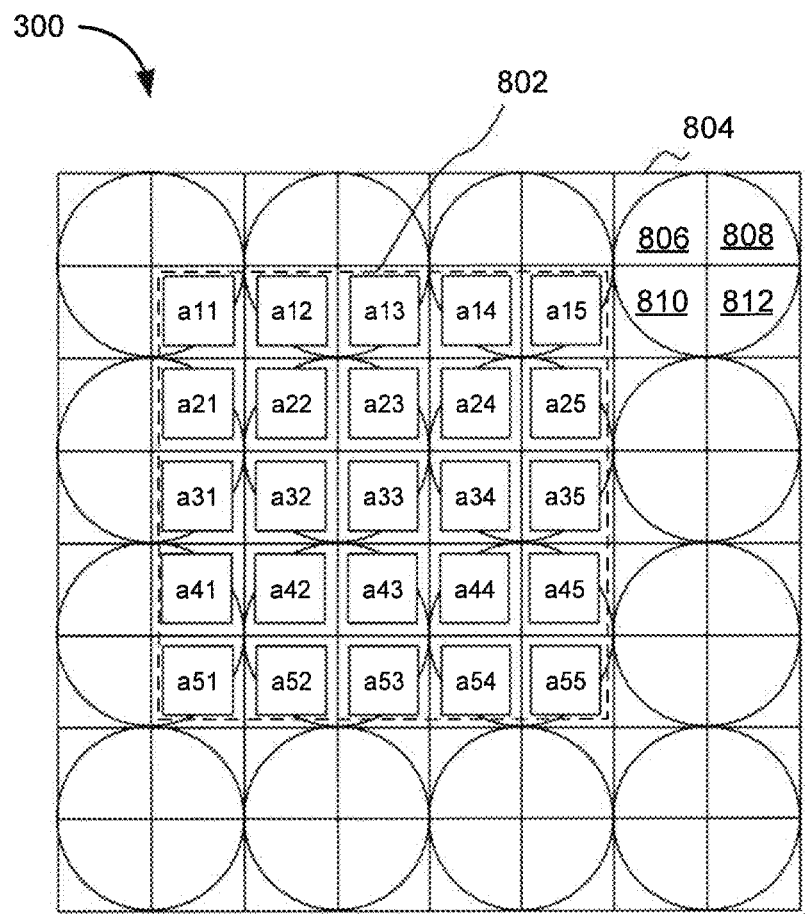
FIG. 8B shows a 5×5 kernel or convolution matrix on top of an image, according to an embodiment of the present invention.

FIG. 8B shows, for example, 5×5 kernel 802 (Kernel 1) has moved to a new position, when the convolution is in process. Element of kernel all is located at a position of lower right PD pixel, a12 is located at a position of lower left PD pixel, a13 is located at a position of lower right PD pixel, a14 is located at a position of lower left PD pixel, and a15 is located at a position of lower right PD pixel. And so on.

Furthermore, a11, a13, a15, a31, a33, a35, a51, a53, a55 are located at positions of lower right PD pixels, respectively. a12, a14, a32, a34, a52, a54 are located at positions of lower left PD pixels, respectively. a21, a23, a25, a41, a43, a45 are located at positions of upper right PD pixels, respectively. a22, a24, a42, a44 are located at positions of upper left PD pixels, respectively.

Regardless where 5×5 kernel 802 (Kernel 1) is positioned on image 804, a11, a13, a15, a31, a33, a35, a51, a53, a55 are located at positions of, either upper left, upper right, lower left, or lower right PD pixels. Similarly, a12, a14, a32, a34, a52, a54 are located at positions of, either upper left, upper right, lower left, or lower right PD pixels. a21, a23, a25, a41, a43, a45 are located at positions of, either upper left, upper right, lower left, or lower right PD pixels. a22, a24, a42, a44 are located at positions of, either upper left, upper right, lower left, or lower right PD pixels.

To remove artifacts generated by intensity difference among upper left, upper right, lower left, and lower right PD pixels, the affecting upper left, upper right, lower left, and lower right PD pixels are binned. Using kernel 802 (Kernel 1), according to an embodiment of the present invention, PD pixels belong to multiple super pixels, e.g., super pixel 342 (FIG. 3B), are binned, instead of binning the upper left, upper right, lower left, and lower right pixels of only one super pixel.

To keep the balance of the binning of the upper left, upper right, lower left, and lower right PD pixels of multiple super pixels, the total contribution from all upper left pixels, the total contribution from all upper right pixels, the total contribution from all lower left pixels, and the total contribution from all lower right PD pixels, are kept the same.

In other words, $$a11+a13+a15+a31+a33+a35+a51+a53+a55=a12+a14+a32+a34+a52+a54=a21+a23+a25+a41+a43+a45=a22+a24+a42+a44.$$ Equation (1)

In this way, kernel 802 (Kernel 1) may remove artifacts generated by the intensity difference among upper left, upper right, lower left, and lower right PD pixels in the defocused portion, and the sharp image in the in-focus portion may be less affected, because in the in-focus portion, the intensities of upper left, upper right, lower left, and lower right PD pixels are already the same.

The present method is different from low pass filtering. In low pass filtering, the image is convoluted with a kernel independent of the positions of PD pixels. The image is simply made blurred without considering binning of specific PD pixels. In the present method, the image is convoluted with a kernel that the convolution actually performs binning among upper left, upper right, lower left, and lower right PD pixels of multiple super pixels.

For example, a typical 5×5 kernel of low pass filter or smoothing filter (Kernel 2) is shown below, 1 1 1 1 1
1 4 4 4 1
1 4 12 4 1 (Kernel 2)
1 4 4 4 1
1 1 1 1 1.

The typical 5×5 kernel of low pass filter (Kernel 2) does not satisfy Equation (1). A kernel satisfying Equation (1) may function as a low pass or smoothing filter, but generally, a low pass or smoothing filter does not satisfy Equation (1).

Furthermore, 5×5 kernel 802 (Kernel 1) may be an N×N kernel, as shown in the following. N is an odd integer larger than unity, i.e., N: 3, 5, 7, . . .

a11 a12 a13 a14 a15, . . . a1N
a21 a22 a23 a24 a25, a2N
a31 a32 a33 a34 a35, a3N (Kernel 3)
a41 a42 a43 a44 a45, . . . a4N
a51 a52 a53 a54 a55, . . . a5N
aN1 aN2 aN3 aN4 aN5, . . . aNN.

To keep the balance of the binning of the upper left, upper right, lower left, and lower right PD pixels of multiple super pixels, the total contribution from all upper left pixels, the total contribution from all upper right pixels, the total contribution from all lower left pixels, and the total contribution from all lower right PD pixels, are kept the same.

Equation (1) becomes Equation (2).

$$a11+a13+a15+\ldots+a1N+a31+a33+a35+\ldots+a3N+a51+a53+a55+\ldots+a5N++aN1+aN3+aN5+\ldots+aN(N-2)+aNN=a12+a14+\ldots+a1(N-1)+a32+a34+\ldots+a3(N-1)+a52+a54+\ldots+a5(N-1)+\ldots+aN2+aN4+\ldots+aN(N-3)+aN(N-1)=a21+a23+a25+\ldots+a2N+a41+a43+a45+\ldots+a4N+\ldots+a(N-1)1+a(N-1)3+a(N-1)5+\ldots+a(N-1)(N-2)+a(N-1)N=a22+a24+\ldots+a2(N-1)+\ldots+a42+a44+\ldots+a4(N-1)+\ldots+a(N-1)2+a(N-1)4+\ldots+a(N-1)(N-3)+a(N-1)(N-1).$$ Equation (2)

Equation (2) can be written as Equation (3).

$$\sum_{i=1}^{\frac{N+1}{2}}\sum_{j=1}^{\frac{N+1}{2}} a_{2i-1,2j-1} = \sum_{i=1}^{\frac{N+1}{2}}\sum_{j=1}^{\frac{N-1}{2}} a_{2i-1,2j} = \sum_{i=1}^{\frac{N-1}{2}}\sum_{j=1}^{\frac{N+1}{2}} a_{2i,2j-1} = \sum_{i=1}^{\frac{N-1}{2}}\sum_{j=1}^{\frac{N-1}{2}} a_{2i,2j}$$

Equation (3).

In an embodiment, N=3, and a 3×3 kernel may be 1 2 1
2 4 2 (Kernel 4)
1 2 1.

In another embodiment, N=5, and a 5×5 kernel may be 1 2 1 2 1
1 4 8 4 1 (Kernel 5)
2 4 4 4 2
1 2 1 2 1.

Both the 3×3 kernel (Kernel 4) and the 5×5 kernel (Kernel 5) shown above satisfy Equation (3).

Figure 9:
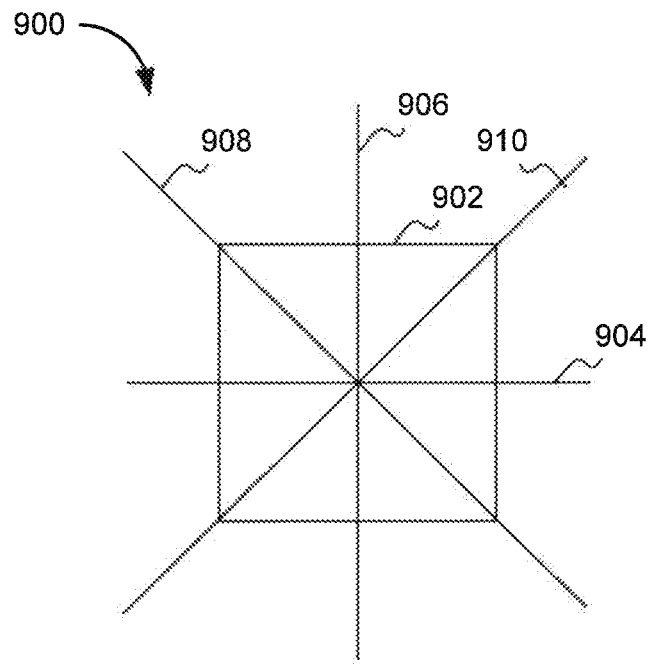
FIG. 9 shows square symmetry.

In addition, a kernel according to an embodiment of the present invention may have a square symmetry. A super pixel comprises upper left PD pixel 806, upper right PD pixel 808, lower left pixel 810, and lower right PD pixel 812 as shown in FIGS. 8A and 8B. The four PD pixels are at four corners of a super pixel forming a square. The kernel shows a square symmetry 900 comprising a square 902 having a horizontal line of symmetry 904, a vertical line of symmetry 906, a primary diagonal line of symmetry 908, and a secondary diagonal line of symmetry 910, as shown in FIG. 9, according to an embodiment of the invention. To be symmetry over upper and lower pixels, the kernel has horizontal line of symmetry 904. To be symmetry over left and right pixels, the kernel has vertical line of symmetry 906. To be symmetry over upper right and lower left pixels, the kernel has primary diagonal line of symmetry 908. To be symmetry over upper left and lower right pixels, the kernel has secondary diagonal line of symmetry 910. In this way, for example, if an image is input up side down, the output will be the same but up side down.

Both the 3×3 kernel (Kernel 4) and the 5×5 kernel (Kernel 5) shown above also have square symmetry.

To preserve the sharp image in the in-focus portion from the smoothing process, the kernel according to an embodiment of the present invention may include negative elements. A high pass filter or sharpening filter accentuates the comparative difference in the values with its neighbors. It includes negative elements to bring out the boundaries between features, e.g., between black and white areas, thus sharpening edges between objects. Notice than the typical 5×5 kernel of low pass filter or smoothing filter (Kernel 2) includes no negative elements.

For example, a typical 5×5 kernel of high pass filter or sharpening filter (Kernel 6) is shown below. It includes negative elements.

−1 −3 −4 −3 −1
−3 0 6 0 −3
−4 6 21 6 −4 (Kernel 6)
−3 0 6 0 −3
−1 −3 −4 −3 −1.

For the purpose of removing artifacts in the defocused portion caused by imbalanced intensities of upper left, upper right, lower left, and lower right PD pixels under one microlens, and preserving sharp image in the in-focus portion, a kernel according to an embodiment of the present invention may include negative elements.

For example, in an embodiment, N=5, a 5×5 kernel may be

−1 −1 −1 −1 −1
−1 1 4 1 −1
−1 4 12 4 −1 (Kernel 7)
−1 1 4 1 −1
−1 −1 −1 −1 −1.

Figure 10:
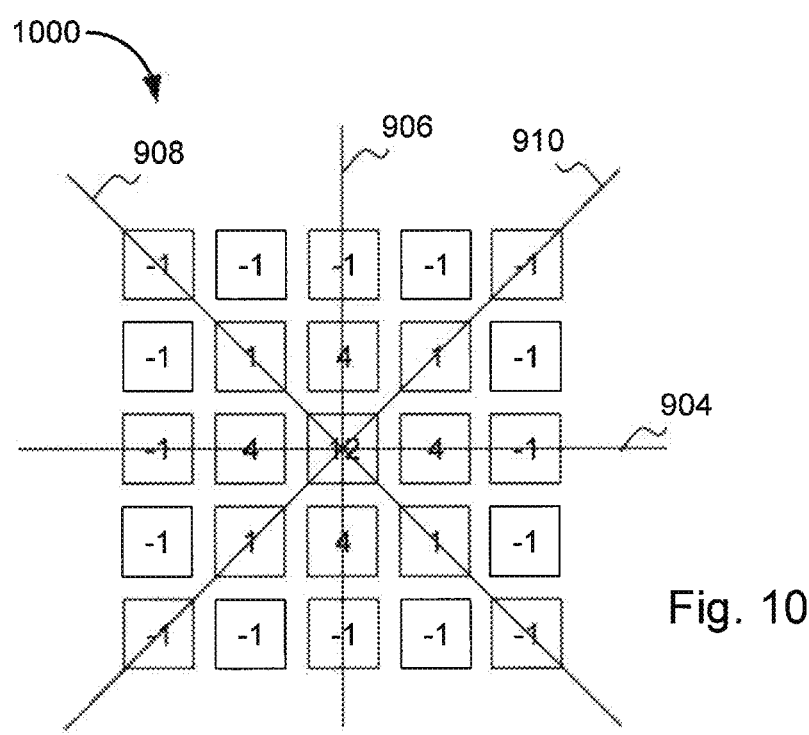
FIG. 10 shows a 5×5 kernel, according to an embodiment of the present invention.

The 5×5 kernel (Kernel 7) is shown as kernel 1000 in FIG. 10, according to an embodiment of the present invention. Kernel 7 or kernel 1000 has horizontal line of symmetry 904, vertical line of symmetry 906, primary diagonal line of symmetry 908, and secondary diagonal line of symmetry 910. Kernel 7 satisfies Equation (3). Furthermore, Kernel 7 includes negative elements.

Kernel 7 satisfies Equation (3), thus it removes artifacts caused by imbalanced intensities of upper left, upper right, lower left, and lower right PD pixels under one microlens. Kernel 7 also has square symmetry. Furthermore, Kernel 7 includes negative elements, thus it also preserves sharp images in the in-focus portion of the image.

A kernel capable removing artifacts caused by imbalanced intensities of upper left, upper right, lower left, and lower right PD pixels under one microlens and preserving sharp image in the in-focus portion may satisfy conditions: (1) Equation (3), (2) square symmetry having horizontal line of symmetry, vertical line of symmetry, primary diagonal line of symmetry, and secondary diagonal line of symmetry, and/or (3) having negative elements.

Remosaicing method 700 may be performed by a processor of an imaging system. The imaging system may comprise a PD image sensor comprising a plurality of PD pixel units, each PD pixel unit comprising an upper left PD pixel, an upper right PD pixel, a lower left PD pixel, and a lower right PD pixel. The upper left PD pixel, the upper right PD pixel, the lower left PD pixel, and the lower right PD pixel are covered by a microlens. The plurality of PD pixel units comprise green PD pixel units, blue PD pixel units, and red PD pixel units. A first Bayer pattern comprises two green PD pixel units, a blue PD pixel unit, and a red PD pixel unit of the plurality of PD pixels.

The processor of the imaging system is configured to interpolate a green image from an image produced by the PD image sensor of the imaging system comprising the first Bayer pattern to obtain a full resolution interpolated green image including upper left PD pixels, upper right PD pixels, lower left PD pixels, and lower right PD pixels. The full resolution interpolated green image is convoluted with with an N×N kernel to correct the full resolution interpolated green image, the N×N kernel comprising elements $a_{ij}$, where N is an odd integer larger than unity and elements $a_{ij}$ satisfy Equation (3).

Remosaicing method 700 may be applied for remosaicing a second Bayer image from a first Bayer image. The first Bayer image comprises a first Bayer pattern comprising two green PD pixel units, a blue PD pixel unit, and a red PD pixel unit. The second Bayer image comprises a second Bayer pattern comprising two green PD pixels, a blue PD pixel, and a red PD pixel. A PD pixel unit comprises four PD pixels under a microlens.

Method 700 comprises interpolating a green image from the first Bayer image to obtain a full resolution interpolated green image including defocused portions having artifacts and in-focus portions having sharp image. The full resolution interpolated green image includes upper left PD pixels, upper right PD pixels, lower left PD pixels, and lower right PD pixels. The method also comprises correcting the full resolution interpolated green image by convoluting the full resolution interpolated green image with an N×N kernel. N is an odd integer larger than unity. The N×N kernel comprises elements $a_{ij}$, and elements $a_{ij}$ satisfy Equation (3). The artifacts of the defocused portions are removed from the corrected full resolution interpolated green image, and the sharp image of the in-focus portions is preserved in the corrected full resolution interpolated green image.

While the present invention has been described herein with respect to the exemplary embodiments and the best mode for practicing the invention, it will be apparent to one of ordinary skill in the art that many modifications, improvements and sub-combinations of the various embodiments, adaptations, and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An imaging system comprising:
   a phase-detection (PD) image sensor comprising a plurality of PD pixel units, each PD pixel unit comprising an upper left PD pixel, an upper right PD pixel, a lower left PD pixel, and a lower right PD pixel, wherein the upper left PD pixel, the upper right PD pixel, the lower left PD pixel, and the lower right PD pixel are covered by a microlens;
   wherein the plurality of PD pixel units comprise green PD pixel units, blue PD pixel units, and red PD pixel units; and
   wherein a first Bayer pattern comprises two green PD pixel units, a blue PD pixel unit, and a red PD pixel unit of the plurality of PD pixel units;
   a processor configured to:
   interpolate a green image from an image produced by the PD image sensor comprising the first Bayer pattern to obtain a full resolution interpolated green image including upper left PD pixels, upper right PD pixels, lower left PD pixels, and lower right PD pixels;
   convolute the full resolution interpolated green image with an N×N kernel to correct the full resolution interpolated green image, the N×N kernel comprising elements $a_{ij}$, wherein N is an odd integer larger than unity; and
   wherein the elements $a_{ij}$ satisfy an equation:

$$\sum_{i=1}^{\frac{N+1}{2}} \sum_{j=1}^{\frac{N+1}{2}} a_{2i-1,2j-1} = \sum_{i=1}^{\frac{N+1}{2}} \sum_{j=1}^{\frac{N-1}{2}} a_{2i-1,2j} = \sum_{i=1}^{\frac{N-1}{2}} \sum_{j=1}^{\frac{N+1}{2}} a_{2i,2j-1} = \sum_{i=1}^{\frac{N-1}{2}} \sum_{j=1}^{\frac{N-1}{2}} a_{2i,2j}.$$

2. The imaging system of claim 1, wherein the N×N kernel has a horizontal line of symmetry, a vertical line of symmetry, a primary diagonal line of symmetry, and a secondary diagonal of symmetry.

3. The imaging system of claim 2, wherein N is 3, and the N×N kernel is:
1 2 1
2 4 2
1 2 1.

4. The imaging system of claim 2, wherein N is 5, and the N×N kernel is:
1 2 1 2 1
2 4 4 4 2
1 4 8 4 1
2 4 4 4 2
1 2 1 2 1.

5. The imaging system of claim 2, wherein the N×N kernel includes negative elements.

6. The imaging system of claim 5, wherein N is 5, and the N×N kernel is:
−1 −1 −1 −1 −1
1 1 4 1 −1
−1 4 12 4 −1
—1 1 4 1 −1
−1 −1 −1 −1 −1.

7. The imaging system of claim 1, wherein the processor is further configured to:
interpolate a blue image and a red image partially from the image produced by the PD image sensor comprising the first Bayer pattern and partially based on the corrected full resolution interpolated green image; and
form a second Bayer image using the interpolated blue image and red image and part of the corrected full resolution interpolated green image;
wherein the second Bayer image comprises a second Bayer pattern comprising two green PD pixels, a blue PD pixel, and a red PD pixel.

8. A method for remosaicing a second Bayer image from a first Bayer image, the first Bayer image comprising green pixel units, blue pixel units, and red pixel units, wherein each pixel unit comprises an upper left PD pixel, an upper right PD pixel, a lower left PD pixel, and a lower right PD pixel, wherein the upper left PD pixel, the upper right PD pixel, the lower left PD pixel, and the lower right PD pixel are covered by a microlens, and wherein the first Bayer image comprises a first Bayer pattern comprising two green PD pixel units, a blue PD pixel unit, and a red PD pixel unit, comprising:
interpolating a green image from the first Bayer image to obtain a full resolution interpolated green image including defocused portions having artifacts and in-focus portions having sharp image, wherein the full resolution interpolated green image includes upper left PD pixels, upper right PD pixels, lower left PD pixels, and lower right PD pixels;
correcting the full resolution interpolated green image by convoluting the full resolution interpolated green image with an N×N kernel, wherein N is an odd integer larger than unity;
wherein the N×N kernel comprises elements $a_{ij}$, and the elements aj satisfy an equation:

$$\sum_{i=1}^{\frac{N+1}{2}} \sum_{j=1}^{\frac{N+1}{2}} a_{2i-1,2j-1} = \sum_{i=1}^{\frac{N+1}{2}} \sum_{j=1}^{\frac{N-1}{2}} a_{2i-1,2j} = \sum_{i=1}^{\frac{N-1}{2}} \sum_{j=1}^{\frac{N+1}{2}} a_{2i,2j-1} = \sum_{i=1}^{\frac{N-1}{2}} \sum_{j=1}^{\frac{N-1}{2}} a_{2i,2j},$$

wherein the artifacts of the defocused portions are removed from the corrected full resolution interpolated green image, and the sharp image of the in-focus portions is preserved in the corrected full resolution interpolated green image.

9. The method of claim 8, wherein the N×N kernel has a horizontal line of symmetry, a vertical line of symmetry, a primary diagonal line of symmetry, and a secondary diagonal of symmetry.

10. The method of claim 9, wherein N is 3, and the N×N kernel is:
1 2 1
2 4 2
1 2 1.

11. The method of claim 9, wherein N is 5, and the N×N kernel is:
1 2 1 2 1
2 4 4 4 2
1 4 8 4 1
2 4 4 4 2
1 2 1 2 1.

12. The method of claim 9, wherein the N×N kernel includes negative elements.

13. The method of claim 12, wherein N is 5, and the N×N kernel is:
−1 −1 −1 −1 −1
−1 1 4 1 −1
−1 4 12 4 −1
−1 1 4 1 −1
−1 −1 −1 −1 −1.

14. The method of claim 8 further comprising:
interpolating a blue image and a red image partially from the first Bayer image and partially based on the corrected full resolution interpolated green image; and
forming a second Bayer image using the interpolated blue image and red image and part of the corrected full resolution interpolated green image;
wherein the second Bayer image comprises a second Bayer pattern comprising two green PD pixels, a blue PD pixel, and a red PD pixel.

* * * * *